US008876606B2

(12) United States Patent
Bortnik et al.

(10) Patent No.: US 8,876,606 B2
(45) Date of Patent: Nov. 4, 2014

(54) USER-CENTRIC METHOD OF AGGREGATING INFORMATION SOURCES TO REINFORCE DIGITAL IDENTITY

(75) Inventors: Michal Bortnik, Seattle, WA (US); Scott Henson, North Bend, WA (US); Patrick W. O'Kelley, II, Seattle, WA (US); Johan Peter Hansen, Bellevue, WA (US); Ling Tony Chen, Bellevue, WA (US); Jerry A. Johnson, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 1429 days.

(21) Appl. No.: 11/005,674

(22) Filed: Dec. 7, 2004

(65) Prior Publication Data
US 2006/0121987 A1    Jun. 8, 2006

(51) Int. Cl.
*A63F 9/24*      (2006.01)
*A63F 13/30*     (2014.01)

(52) U.S. Cl.
CPC ........... *A63F 13/12* (2013.01); *A63F 2300/407* (2013.01); *A63F 2300/5546* (2013.01); *A63F 2300/558* (2013.01); *A63F 2300/5586* (2013.01)
USPC ................... 463/42; 463/36; 463/47; 463/41; 463/40

(58) Field of Classification Search
USPC ................................................. 463/1, 40–42
See application file for complete search history.

(56) References Cited

U.S. PATENT DOCUMENTS

| 5,083,271 | A |   | 1/1992  | Thacher et al.            |
|-----------|---|---|---------|---------------------------|
| 5,551,701 | A | * | 9/1996  | Bouton et al. ..... 463/36 |
| 5,563,805 | A |   | 10/1996 | Arbuckle et al.           |
| 5,633,484 | A | * | 5/1997  | Zancho et al. ..... 235/380 |
| 5,674,127 | A | * | 10/1997 | Horstmann et al. ..... 463/42 |

(Continued)

FOREIGN PATENT DOCUMENTS

| CN | 1538339 A   | 10/2004 |
|----|-------------|---------|
| EP | 1 520 608 A2 | 4/2005  |

(Continued)

OTHER PUBLICATIONS

Suwalski, Pat, "Automotive Computing with Game Console Hardware," Department of Systems and Computer Engineering at Carleton University, Ottawa, Ontario, Canada (Apr. 2005), <http://www.sce.carleton.ca/facultylwainer/students/dashbox/finalreport.pdf>, 58 pages.

(Continued)

*Primary Examiner* — Paula A D'Agostino
(74) *Attorney, Agent, or Firm* — Bryan Webster; Peter Taylor; Micky Minhas

(57) ABSTRACT

Systems and methods for providing a digital identity or profile in a gaming console that communicates to a remote service. A "Gamer Profile" is created that serves as a building block for services and applications that aim to create a social community of gamers and grow relationships among players. In accordance with the present invention, the Gamer Profile is the entirety of information (e.g., metadata) related to a specific user. The Gamer Profile is developed from a set of services that collect and expose this information in a meaningful way to the community. Feedback information may be included that is provided by other users to further enhance the profile. The Gamer Profile also provides for personalization such that users can customize their gaming experience.

18 Claims, 8 Drawing Sheets

(56) References Cited

U.S. PATENT DOCUMENTS

| | | |
|---|---|---|
| 5,708,709 A | 1/1998 | Rose |
| 5,754,176 A | 5/1998 | Crawford |
| 5,768,382 A | 6/1998 | Schneier et al. |
| 5,779,549 A | 7/1998 | Walker et al. |
| 5,791,992 A | 8/1998 | Crump et al. |
| 5,883,955 A | 3/1999 | Ronning |
| 5,918,010 A | 6/1999 | Appleman et al. |
| 5,945,988 A * | 8/1999 | Williams et al. ............. 715/747 |
| 5,970,143 A | 10/1999 | Schneier et al. |
| 6,020,884 A | 2/2000 | MacNaughton et al. |
| 6,024,643 A | 2/2000 | Begis |
| 6,071,194 A * | 6/2000 | Sanderson et al. ............. 463/37 |
| 6,081,830 A * | 6/2000 | Schindler ..................... 709/204 |
| 6,106,395 A * | 8/2000 | Begis ............................ 463/23 |
| 6,149,519 A | 11/2000 | Osaki et al. |
| 6,174,237 B1 | 1/2001 | Stephenson |
| 6,200,216 B1 | 3/2001 | Peppel |
| 6,203,432 B1 * | 3/2001 | Roberts et al. ................. 463/37 |
| 6,206,782 B1 | 3/2001 | Walker et al. |
| 6,219,047 B1 | 4/2001 | Bell |
| 6,226,618 B1 | 5/2001 | Downs et al. |
| 6,256,620 B1 | 7/2001 | Jawahar et al. |
| 6,280,328 B1 | 8/2001 | Holch et al. |
| 6,287,201 B1 * | 9/2001 | Hightower ..................... 463/41 |
| 6,293,865 B1 | 9/2001 | Kelly et al. |
| 6,302,793 B1 | 10/2001 | Fertitta, III et al. |
| 6,312,336 B1 | 11/2001 | Handelman et al. |
| 6,322,451 B1 * | 11/2001 | Miura ............................ 463/42 |
| 6,334,214 B1 | 12/2001 | Horstmann |
| 6,343,990 B1 | 2/2002 | Rasmussen et al. |
| 6,352,479 B1 * | 3/2002 | Sparks, II ....................... 463/42 |
| 6,359,572 B1 * | 3/2002 | Vale ............................... 341/23 |
| 6,425,828 B2 | 7/2002 | Walker et al. |
| 6,508,710 B1 | 1/2003 | Paravia et al. |
| 6,511,377 B1 | 1/2003 | Weiss |
| 6,519,629 B2 | 2/2003 | Harvey et al. |
| 6,544,126 B2 | 4/2003 | Sawano et al. |
| 6,572,477 B2 | 6/2003 | Hightower |
| 6,645,068 B1 | 11/2003 | Kelly et al. |
| 6,648,760 B1 | 11/2003 | Nicastro |
| 6,688,978 B1 | 2/2004 | Herman |
| 6,699,124 B2 | 3/2004 | Suchocki |
| 6,708,172 B1 * | 3/2004 | Wong et al. ..................... 1/1 |
| 6,732,197 B1 * | 5/2004 | Overy ............................ 710/8 |
| 6,742,032 B1 * | 5/2004 | Castellani et al. ............ 709/224 |
| 6,746,332 B1 | 6/2004 | Ing et al. |
| 6,755,743 B1 | 6/2004 | Yamashita et al. |
| 6,804,675 B1 * | 10/2004 | Knight et al. ................. 707/754 |
| 6,805,634 B1 | 10/2004 | Wells et al. |
| 6,821,205 B2 | 11/2004 | Takahashi et al. |
| 6,829,569 B1 | 12/2004 | Drucker et al. |
| 6,839,435 B1 | 1/2005 | Iijima et al. |
| 6,939,233 B2 | 9/2005 | Emmerson |
| 6,941,353 B1 | 9/2005 | Lane |
| 6,979,267 B2 * | 12/2005 | Leen et al. ..................... 463/42 |
| 6,996,444 B2 | 2/2006 | Ach, III |
| 7,033,276 B2 * | 4/2006 | Walker et al. ................. 463/40 |
| 7,035,653 B2 | 4/2006 | Simon et al. |
| 7,056,217 B1 * | 6/2006 | Pelkey et al. ................... 463/43 |
| 7,069,308 B2 * | 6/2006 | Abrams ......................... 709/218 |
| 7,086,946 B2 | 8/2006 | Yoshida |
| 7,115,033 B1 | 10/2006 | Timperley |
| 7,192,352 B2 | 3/2007 | Walker et al. |
| 7,207,011 B2 | 4/2007 | Mulvey et al. |
| 7,240,093 B1 | 7/2007 | Danieli et al. |
| 7,311,601 B2 | 12/2007 | Anderson et al. |
| 7,311,608 B1 * | 12/2007 | Danieli et al. ................. 463/42 |
| 7,422,521 B2 | 9/2008 | Peterson |
| 7,424,617 B2 | 9/2008 | Boyd et al. |
| 7,490,286 B2 | 2/2009 | Commarford et al. |
| 7,614,955 B2 * | 11/2009 | Farnham et al. ............... 463/42 |
| 7,621,813 B2 | 11/2009 | Bortnik et al. |
| 7,698,178 B2 | 4/2010 | Chu |
| 7,711,847 B2 | 5/2010 | Dhupelia et al. |
| 7,730,010 B2 * | 6/2010 | Kishore et al. ................ 707/783 |
| 7,756,926 B2 * | 7/2010 | Tseng et al. ................... 709/204 |
| 7,837,561 B2 | 11/2010 | Bortnik et al. |
| 7,857,701 B2 | 12/2010 | Murphy et al. |
| 7,883,413 B2 | 2/2011 | Paulsen |
| 7,887,419 B2 | 2/2011 | Bortnik et al. |
| 7,914,381 B2 | 3/2011 | Blythe et al. |
| 7,918,738 B2 | 4/2011 | Paulsen |
| 8,025,571 B2 | 9/2011 | Cisneros et al. |
| 8,109,828 B2 | 2/2012 | Kane et al. |
| 8,231,472 B2 | 7/2012 | Bortnik et al. |
| 8,235,818 B2 | 8/2012 | Bortnik et al. |
| 8,277,325 B2 | 10/2012 | Bortnik et al. |
| 2001/0010046 A1 | 7/2001 | Muyres et al. |
| 2002/0002510 A1 | 1/2002 | Sharp et al. |
| 2002/0023230 A1 * | 2/2002 | Bolnick et al. ................. 713/202 |
| 2002/0035568 A1 | 3/2002 | Benthin et al. |
| 2002/0049507 A1 | 4/2002 | Hameen-Anttila |
| 2002/0062316 A1 | 5/2002 | Maehiro |
| 2002/0062350 A1 | 5/2002 | Maehiro |
| 2002/0082077 A1 | 6/2002 | Johnson et al. |
| 2002/0082086 A1 * | 6/2002 | Scallie ............................ 463/42 |
| 2002/0082939 A1 | 6/2002 | Clark et al. |
| 2002/0083145 A1 * | 6/2002 | Perinpanathan ............... 709/213 |
| 2002/0090996 A1 | 7/2002 | Maehiro |
| 2002/0094851 A1 | 7/2002 | Rheey |
| 2002/0115488 A1 | 8/2002 | Berry et al. |
| 2002/0119824 A1 | 8/2002 | Allen |
| 2002/0142842 A1 * | 10/2002 | Easley et al. .................... 463/42 |
| 2002/0151366 A1 * | 10/2002 | Walker et al. ................... 463/42 |
| 2002/0160838 A1 | 10/2002 | Kim |
| 2002/0173349 A1 | 11/2002 | Ach, III |
| 2002/0198949 A1 * | 12/2002 | Maehiro ......................... 709/206 |
| 2003/0009549 A1 * | 1/2003 | Maehiro ......................... 709/223 |
| 2003/0043179 A1 | 3/2003 | Gusler et al. |
| 2003/0045358 A1 | 3/2003 | Leen et al. |
| 2003/0050115 A1 | 3/2003 | Leen et al. |
| 2003/0070176 A1 | 4/2003 | Parker et al. |
| 2003/0100363 A1 | 5/2003 | Ali |
| 2003/0104868 A1 | 6/2003 | Okita et al. |
| 2003/0109301 A1 | 6/2003 | Chudley et al. |
| 2003/0109305 A1 | 6/2003 | Gavin et al. |
| 2003/0181242 A1 | 9/2003 | Lee et al. |
| 2003/0190960 A1 | 10/2003 | Jokipii et al. |
| 2003/0216962 A1 * | 11/2003 | Heller et al. ..................... 705/14 |
| 2004/0087373 A1 | 5/2004 | Choi |
| 2004/0088325 A1 * | 5/2004 | Elder et al. ................... 707/104.1 |
| 2004/0097287 A1 | 5/2004 | Postrel |
| 2004/0107283 A1 * | 6/2004 | Paddon ........................... 709/229 |
| 2004/0121835 A1 | 6/2004 | Willis et al. |
| 2004/0172533 A1 | 9/2004 | DeMello et al. |
| 2004/0192440 A1 * | 9/2004 | Evans et al. ..................... 463/30 |
| 2004/0198497 A1 | 10/2004 | Yamashita et al. |
| 2004/0225386 A1 | 11/2004 | Thompson et al. |
| 2004/0229698 A1 * | 11/2004 | Lind et al. ...................... 463/42 |
| 2004/0242327 A1 | 12/2004 | Shahar |
| 2004/0259641 A1 | 12/2004 | Ho |
| 2005/0049037 A1 | 3/2005 | Anderson et al. |
| 2005/0054431 A1 | 3/2005 | Walker et al. |
| 2005/0070359 A1 * | 3/2005 | Rodriquez et al. ............... 463/42 |
| 2005/0071786 A1 | 3/2005 | Mariani et al. |
| 2005/0107157 A1 | 5/2005 | Wachtfogel et al. |
| 2005/0130742 A1 * | 6/2005 | Feldman et al. ................ 463/39 |
| 2005/0137014 A1 * | 6/2005 | Vetelainen ...................... 463/42 |
| 2005/0137015 A1 | 6/2005 | Rogers et al. |
| 2005/0143174 A1 | 6/2005 | Goldman et al. |
| 2005/0154557 A1 * | 7/2005 | Ebert ............................. 702/182 |
| 2005/0170873 A1 * | 8/2005 | Fishbach et al. ................. 463/9 |
| 2005/0192097 A1 * | 9/2005 | Farnham et al. ................ 463/42 |
| 2005/0209002 A1 * | 9/2005 | Blythe et al. ................... 463/42 |
| 2005/0240603 A1 | 10/2005 | Bodin et al. |
| 2005/0245314 A1 | 11/2005 | Pirich et al. |
| 2005/0246638 A1 | 11/2005 | Whitten |
| 2005/0261062 A1 | 11/2005 | Lewin et al. |
| 2005/0282636 A1 | 12/2005 | O'Brien |
| 2006/0048132 A1 | 3/2006 | Chen et al. |
| 2006/0052168 A1 | 3/2006 | Shacham |
| 2006/0064761 A1 | 3/2006 | Multerer et al. |
| 2006/0075019 A1 | 4/2006 | Donovan et al. |
| 2006/0085642 A1 | 4/2006 | Multerer et al. |

(56) References Cited

U.S. PATENT DOCUMENTS

| | | | |
|---|---|---|---|
| 2006/0121987 A1 | 6/2006 | Bortnik et al. | |
| 2006/0121991 A1 | 6/2006 | Borinik et al. | |
| 2006/0121992 A1 | 6/2006 | Bortnik et al. | |
| 2006/0122716 A1 | 6/2006 | Bortnik et al. | |
| 2006/0136964 A1 | 6/2006 | Diez et al. | |
| 2006/0172799 A1 | 8/2006 | Kane et al. | |
| 2006/0183542 A1 | 8/2006 | Ng et al. | |
| 2006/0191016 A1 | 8/2006 | Ostergren et al. | |
| 2006/0196686 A1 | 9/2006 | Gatto et al. | |
| 2006/0258463 A1 | 11/2006 | Cugno et al. | |
| 2007/0099703 A1 | 5/2007 | Terebilo | |
| 2007/0111794 A1* | 5/2007 | Hogan et al. | 463/42 |
| 2007/0117629 A1 | 5/2007 | Fowler et al. | |
| 2007/0173321 A1 | 7/2007 | Shen et al. | |
| 2007/0173327 A1 | 7/2007 | Kilgore et al. | |
| 2007/0191097 A1 | 8/2007 | Johnson | |
| 2008/0113789 A1 | 5/2008 | Canessa et al. | |
| 2010/0035681 A1 | 2/2010 | Bortnik et al. | |
| 2011/0045912 A1 | 2/2011 | Bortnik et al. | |
| 2011/0118035 A1 | 5/2011 | Bortnik et al. | |
| 2011/0136575 A1 | 6/2011 | Bortnik et al. | |
| 2011/0250959 A1 | 10/2011 | Bortnik et al. | |
| 2012/0009999 A1 | 1/2012 | Bortnik et al. | |

FOREIGN PATENT DOCUMENTS

| | | |
|---|---|---|
| EP | 1 669 117 A1 | 6/2006 |
| JP | 09-152999 | 6/1997 |
| JP | 2001109714 A | 4/2001 |
| JP | 2001212366 A | 8/2001 |
| JP | 2002-085852 A | 3/2002 |
| JP | 2002210246 A | 7/2002 |
| JP | 2002-239251 A | 8/2002 |
| JP | 2003-047778 A | 2/2003 |
| JP | 2003111980 A | 4/2003 |
| JP | 2003154172 A | 5/2003 |
| JP | 2003205175 A | 7/2003 |
| JP | 2003-271780 A | 9/2003 |
| JP | 2003281142 A | 10/2003 |
| JP | 2003-337874 A | 11/2003 |
| JP | 2003340161 A | 12/2003 |
| JP | 2004097610 A | 4/2004 |
| JP | 2004-329914 A | 11/2004 |
| KR | 20000030338 A | 6/2000 |
| KR | 20010082566 A | 8/2001 |
| KR | 1020050003224 A | 1/2005 |
| KR | 1020050105396 A | 11/2005 |
| WO | 00/04458 A1 | 1/2000 |
| WO | 2005092458 A1 | 10/2005 |

OTHER PUBLICATIONS

Akkawi, Amjad et al., "A Mobile Gaming Platform for the IMS," Network and System Support for Games, Porc. of 3rd ACM SIGCOMM Workshop on System Support for Games (2004), <http://citeseerx.ist.psu.edu/viewdoc/summary? doi=10.1.1.91.676>, 8 pages.
Huang, Andrew "bunnie," "Keeping Secrets in Hardware: the Mircrosoft XBox™ Case Study," AI Memo 2002-008, Massachusetts Institute of Technology-artificial intelligence laboratory (May 26, 2002), <http://web.mit.edu/bunnie/www/projanatak/AIM-2002-008.pdf>, 15 pages.
Abrash, Michael, "Inside Xbox Graphics—A Powerful Game Platform Waiting in the Wings," drdobbs.com, (Aug. 1, 2000), <http://www.drdobbs.com/184404199>, Access date: Apr. 20, 2010, 9 pages.
Henshaw, Jeff, "Inside Xbox 360: An Interview with Jeff Henshaw," Interview by Paul Thurrott, Paul Thurrott's Supersite for Windows, Jun. 21-Jul. 7, 2005, <http://www.winsupersite.com/showcase/xbox360_inside.asp>, Access date: Apr. 20, 2010, 12 pages.
Larocque, Daniel, "State Pattern in C++ Applications," Codeguru.com (Sep. 17, 2001), <http://www.codeguru.com/cpp/misc/misc/article.php/c3893>, Access date: Apr. 20, 2010, 2 pages.
Chinese Patent Application 200510119213.7; Final Rejection dated May 25, 2011 (MS#310375.04).
Japanese Patent Application 2005-311712; Notice of Rejection dated Jun. 3, 2011 (MS#310375.03).
Japanese Patent Office, Notice of Rejection from Japanese Patent Application No. 2005319924, mailed Aug. 10, 2012, 5 pages.
European Patent Office, Examination Report of European Patent Application No. 05110463.6, Germany, Jan. 10, 2007, 6 pages.
European Patent Office, Extended European Search Report of European Patent Application No. 05110463.6, Feb. 28, 2006, The Netherlands, 8 pages.
Patent Office of Japan, Notice of Rejection of Japanese Patent Application No. 2005-311712, Aug. 31, 2012, Japan, 8 pages.
Patent Office of Japan, Notice of Rejection of Japanese Patent Application No. 2005-319924, Jun. 3, 2011, Japan, 9 pages.
Patent Office of Japan, Notice of Rejection of Japanese Patent Application No. 2005-319924, Aug. 10, 2012, Japan, 5 pages.
Patent Office of Korea, Notice of Preliminary Rejection of Korean Patent Application No. 10-2005-0097991, Mar. 29, 2012, South Korea, 16 pages.
EA Sports, "EA Sports Tiger Woods PGA Tour 2004 XBox Manual", Sep. 22, 2003,14 pages.
"Phantasy Star Online IGN Guide", IGN Guides, http://tails.kicks-ass.net/content/sorting/clean/gaming/sega_scene_releases/sega_dreamcast_manuals/PHANTASYSTAR OLINE IGN-GUIDE.PDF, Accessed May 17, 2001, 64 pages.
Adams, Eric et al., "Selecting Tools for Online Communities: Suggestions for Learning Technologists", The Technology Source Archives at the University of North Carolina, http://technologysource.org/article/selecting_tools_for_online_communities/, Jul. 2003, 6 pages.
"Braingle's Online Multiplayer Checkers Ladder", Braingle, http://www.braingle.in/games/checkers/index.php, Accessed May 13, 2014, 2 pages.
"Gizzer", Braingle, https://web.archive.org/web/20031004154555/http://www.braingle.com/view.php?user=Gizzer, Accessed May 13, 2014, 3 pages.
"The Older Gamers Forums—FAQ: User Profile Features", The Older Garners Forum, http://www.theoldergamers.com/forum/faq.php?faq=vb3_user_profile, Accessed May 13, 2014, 6 pages.
"Online Now—Braingle's Online Multiplayer Checkers Ladder", Braingle, http://www.braingle.in/games/checkers/index.php, Oct. 2, 2003, 3 pages.

* cited by examiner

USER-CENTRIC METHOD OF AGGREGATING INFORMATION SOURCES TO REINFORCE DIGITAL IDENTITY

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright © 2004, Microsoft Corporation, All Rights Reserved.

FIELD OF THE INVENTION

This invention generally relates to the field of gaming and multimedia devices. In particular, the present invention is directed to a system and method of creating and maintaining a unique gaming identity.

BACKGROUND OF THE INVENTION

Conventional gaming systems include a concept of unique identity, which was intended to increase player satisfaction and create a sense of community. However, while the conventional unique identity does minimize the effort required to play online, the unique identity failed to accomplish these goals. One reason for this problem is that multiple players often share an identity because there is no easy way for multiple players to identify themselves on a shared gaming device. This creates confusion as a player using a particular identity during an online gaming session, may not be the same player in the next session or from the previous session.

Further, conventional identities have failed to provide a method for conveying information about players other than a limited set of game achievements. Thus, it is difficult to learn more about a player through the unique identity. For example, players cannot the determine the country or location of other players, cannot record personal greetings or see other players' avatars (display tiles) outside of a specific game, and cannot determine a player's reputation, etc. Therefore, there is a need for a unique identity that is rich, customizable and engaging. The identity should be public and automatically shared with the rest of the community, while protecting a player's privacy. The present invention provides such a solution.

SUMMARY OF THE INVENTION

The present invention is direct to methods and devices for aggregating information related to users to create a digital identity or profile of the user. In accordance with a aspect of the invention, there is provided in a gaming service to which gaming devices are remotely connected, a method of creating and maintaining a profile about a user that is available to other users of the gaming service. The method includes receiving self-provided information from the user; receiving the user's game playing achievements; receiving feedback information regarding the user from other users; storing the user's game playing achievements and feedback information in a profile; and making the profile available to the other users in accordance with user's preferences.

According to features of the invention, the service may receive game customization preferences from the user and store the game customization preferences in the profile. The game customization preferences may be applied to gaming applications and controller devices on the gaming devices connected to the gaming service.

The data accumulated to the gaming service may be used to populate a guide that is executed on the gaming devices. The guide provides a graphical interface to navigate the profile information of the user and other users of the service. The guide may provide a friends list or a recent players list.

An offline mode is provided in the gaming devices where the game playing achievements are accumulated when the user is not connected to the gaming service. The achievements are synchronized upon a next connection to the gaming service. The user's gaming reputation is built based upon the feedback information and the game playing achievements. Reward points may be awarded to the user based on the game playing achievements.

Optionally, the user's presence information may be made available to the other users.

In accordance with another aspect of the invention, there is provided a gaming console that includes a processor adapted to run gaming applications on the gaming console, a memory for storing game-related and user-related data, and a network interface. The gaming console aggregates data related to the user's interaction with the gaming applications and forwards the data to a remote service via the network interface.

The digital identity information may include data regarding the user's interaction with the gaming applications, preferences, game achievements and reward points. Feedback information about the user may be provided by other users of the remote service that is added to the digital identity.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
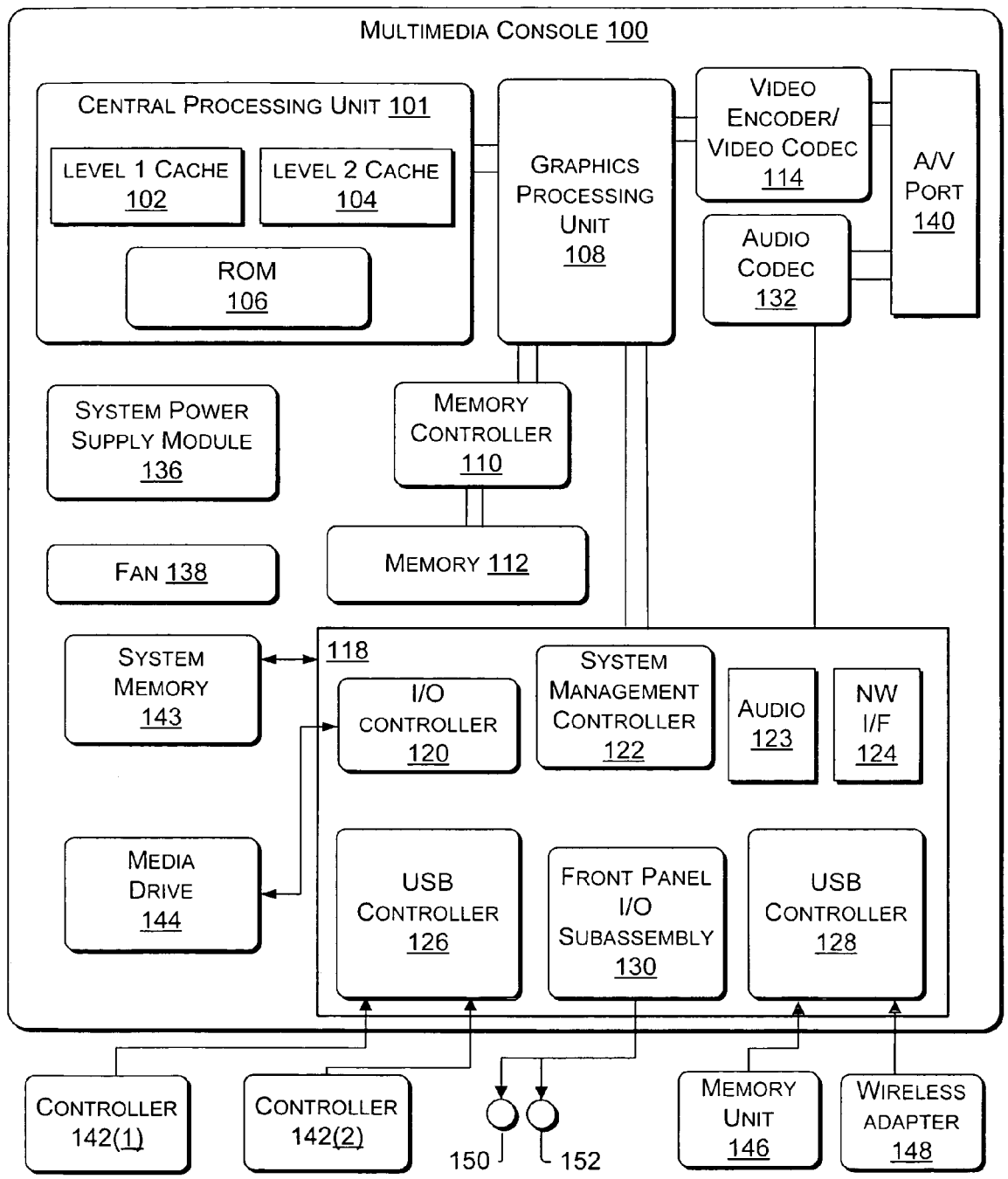
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The present invention is directed to a "Gamer Profile," which serves as a building block for services and applications that aim to create a social community of gamers and grow relationships among players. In accordance with the present invention, the Gamer Profile is the entirety of information (e.g., metadata) related to a specific user (i.e., the gamer's digital identity). The Gamer Profile is developed from a set of services that collect and expose this information in a meaningful way to the community. The Gamer Profile also provides for personalization such that users can customize and enhance their gaming experience. As will be discussed in greater detail below, the Gamer Profile consists of various components, including, but not limited to, a Gamercard, game achievements, and gamer preferences.

Figure 2:
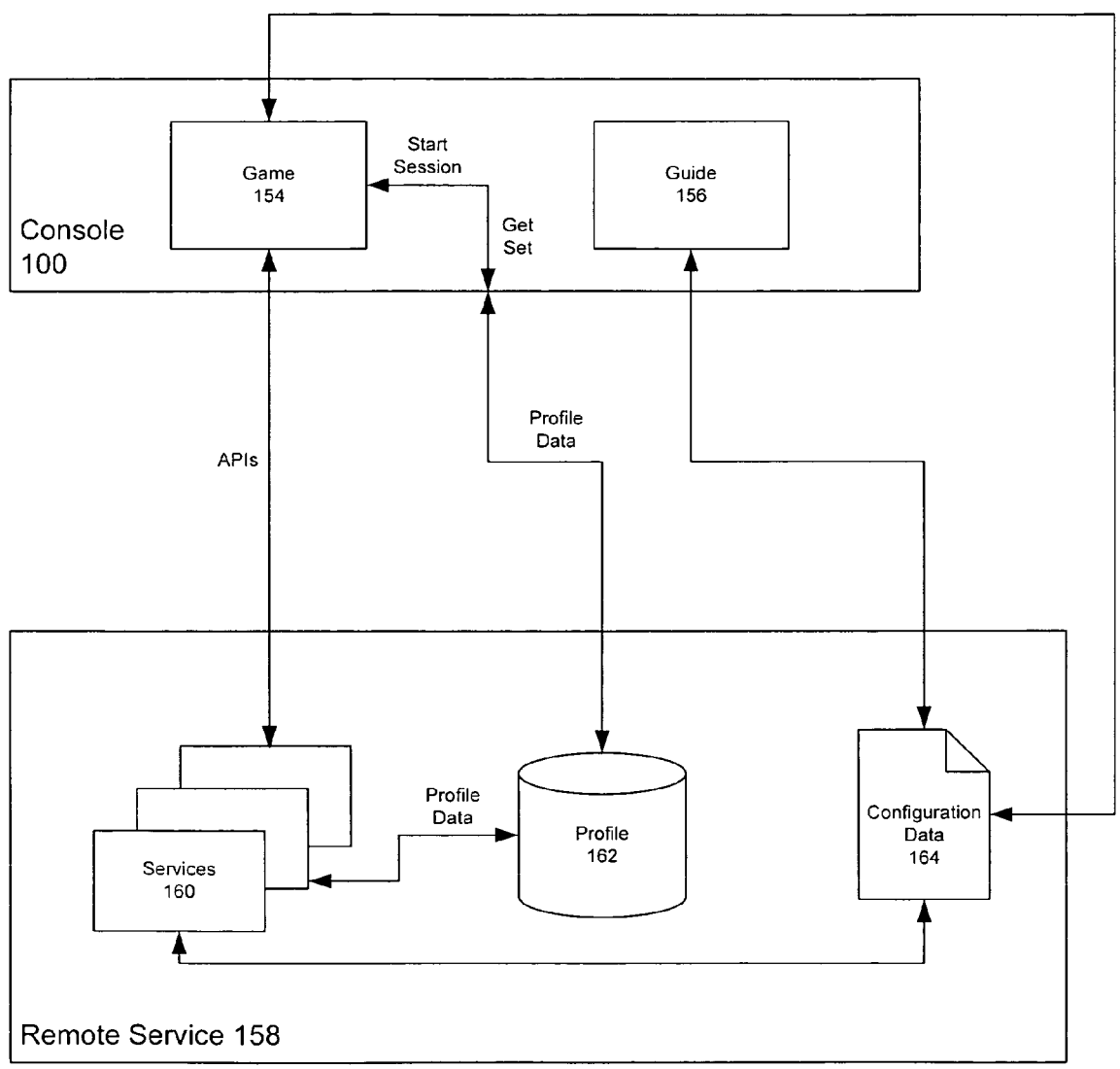
FIG. 2 illustrates an exemplary architecture in which the present invention may be implemented.

Referring to FIG. 2, there is illustrated an overview of an exemplary architecture that may be used to implement the Gamer Profile. The console 100 interacts with a remote service 158 that provides services 160 such as voice/chat, a friends list, matchmaking, content download, roaming, feedback, tournaments, voice messaging, and updates to gamers. The service 158 also maintains the Gamer Profiles in a profile database 162 and configuration data 164 used by the services 160 and games 154. The service 158 collects Gamer Profiles, aggregates, processes information supplied by other services 160, and fulfills real-time client requests for retrieving Gamer Profile-related services. The Gamer Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. The configuration data 164 stored by the service 158 may be used to determine features and options provided by the guide 156. When the game 154 is running, a defined set of APIs are used to call and interact with the services 160. When requesting Gamer Profile information via the APIs, the game 154 may pass a unique identifier of a user. The service 158 may return a Gamercard (discussed below), game stats, game achievements, affiliations, game settings. etc. Additional details of the various aspects of the exemplary architecture are provided below.

Figure 3:
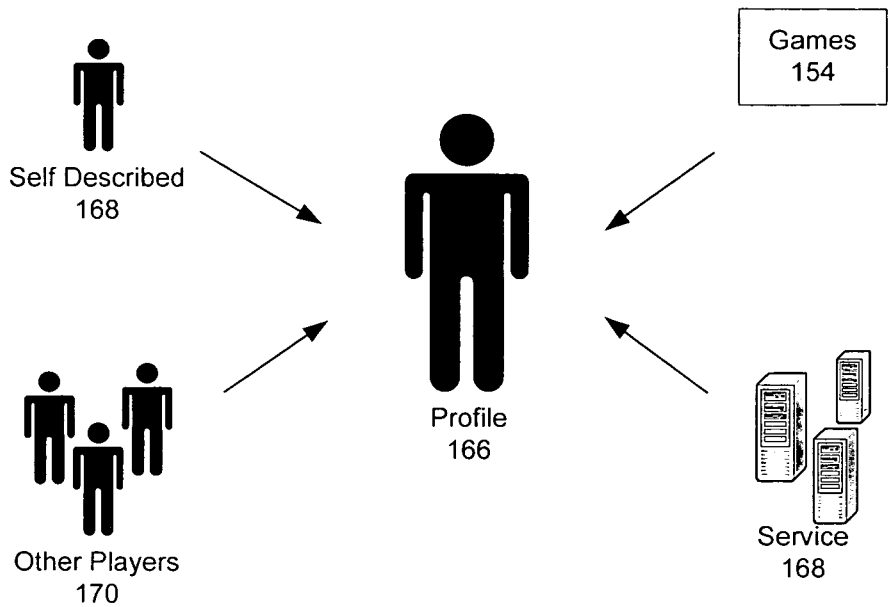
FIG. 3 illustrates sources of information that provide input to a Gamer Profile.

Referring to FIG. 3, the Gamer Profile 166 is created when a user creates a profile (selected from the guide 156) and chooses his/her unique Gamertag (a user's unique name), tile (picture/avatar associated with the user) other options during an account sign-up phase. From there, a base Gamer Profile 166 is created. The Gamer Profile 166 may then be populated from several sources. For example, the Gamer Profile 166 may include self-described data 168 from the Gamer Profile owner. Other gamers 170 can provide feedback regarding the Gamer Profile owner. The service 158 may track the gamer's online and offline activity. In addition, the games 154 may report the gamer's statistics and game achievements.

The owner of Gamer Profile can edit his/her Gamer Profile 166 directly and control who can view each section of the Gamer Profile. The Gamer Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the Gamer Profile to, e.g., restrict presence information only to friends, allow game achievements to be visible to all, etc.

The Gamer Profile 166 may include feedback provided by other players 170. Feedback helps others learn about a particular gamer. For example, if the gamer uses foul language or aggressive play in game sessions, other gamers may submit feedback to the service 158. The feedback mechanism improves the user experience by building reputations. Players are therefore anonymous, but not unknown because of the accumulated feedback.

In another aspect of the invention, the service 158 and games 154 track online and offline activity of gamers to provide usage statistics in the Gamer Profile 166. When a gamer plays online, a particular game title is added to list of games played that is made visible to others. While offline, the game console 100 and game 154 track the gamer's activity via a mechanism for instrumenting games to collect detailed information about a specific player's in-game statistics and accomplishments. The Gamer Profile 166 is updated during the next connection to the service 158 to reflect the offline play. Game achievements may be reported to the service 154 by games via the Gamer Profile data mechanism.

As noted above the Gamer Profile 166 may be used for customization and preference setting on a global level, as well as a per game level. Gamer preferences aid games 154 in choosing defaults for common settings such as game profile name, controller inversion and controller vibration, etc. For example, if a gamer likes using an inverted controller, this preference will be used for new titles as they are played. Games 154 have access to Gamer Profiles via the database 162 and services 160. In addition, game usage data can be mined to tune the game 154 to the user's particular preferences and game features updated after the initial game launch.

A presence service may be included to provide information about users' whereabouts and activities. Presence information will be available to those users the gamer wishes to share it. The Gamer Profile will be the primary way to access the presence information.

Referring to FIGS. 4-13, the Gamer Profile can be viewed in a number of ways and forms, and is typically displayed in the Gamercard 172. The Gamercard 172 is the visual representation of the Gamer Profile 166 that is available to games on the console 100 and, e.g., the web. The Gamercard 172 serves as a summary or snapshot of a player's Gamer Profile 166. Gamers may use the Gamercard to set up a matchmaking list where gamers are added to a preferred players list to play again in the future.

Figure 4:
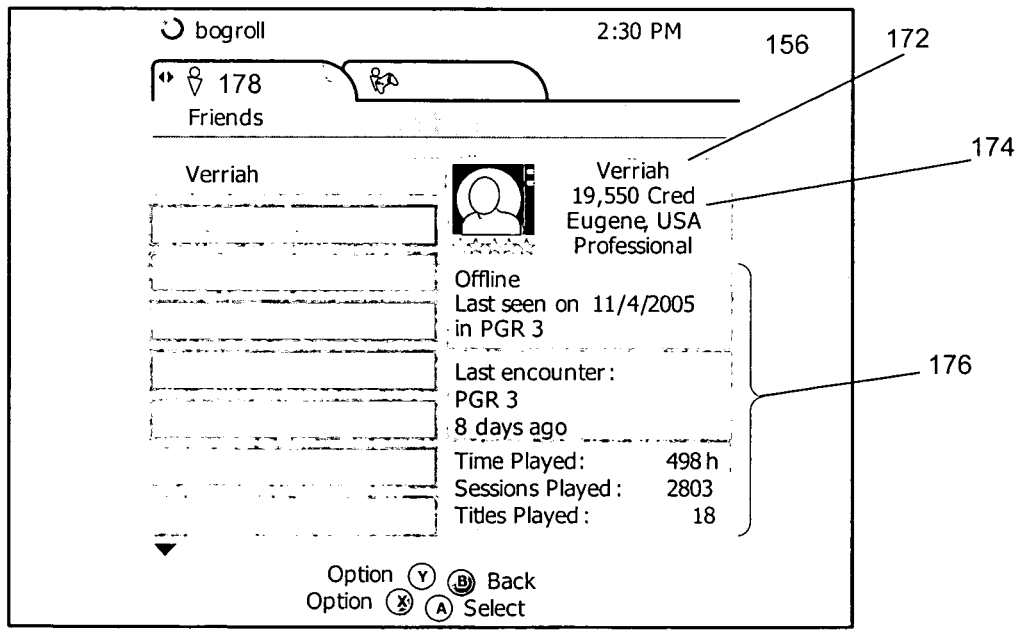
FIGS. 4-13 illustrate various graphical user interfaces in accordance with the present invention.

As shown in FIG. 4, the Gamercard 172 may be divided into two regions, a base area 174 and a context-specific (or extended) area 176. The base area 174 is provides a set of Gamer Profile information in a standard and consistent way across multiple contexts, whereas the extended area 176 may be customized to fit a specific context. Although the Gamercard 172 of FIGS. 4-13 are shown in the context of the guide 156, the Gamercard 172 may be visually separated from the rest of the screen and adopt the background color of the screen it is displayed on. In addition, the Gamercard 172 may be temporarily replaced by an animation while it is being loaded for viewing.

The base area 174 may be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating, gamer Cred (a points-based reward points system), gamer zone, country, membership tier, awards, etc. An offline Gamercard 172 is shown when a player is looking at his/her own Gamercard 172. The offline base area 174 may include a subset of the online base area and may further include information regarding titles played and time played. The base area 174 of a Gamercard 172 is preferably fixed in size, has a consistent, static layout and has a fixed placement of all information elements, such as Tile or Gamer Cred.

The extended area 176 may include a set of Gamercard Actions, such as "View Profile" and "Send Feedback," etc.

The extended area of the Gamercards is preferably not fixed in size, because it may vary based on the context. As shown in FIGS. 4-12 a user may scroll through the list of other users via the guide 156 and a friends list 178. The Gamercard for other users may be displayed as the user scrolls among his/her friends or the user may be presented with an option to see a full view of the Gamer Profile. The full view mode consists of different views of the extended area 176 and may include several sections, such as a Profile Summary, Community Feedback, Game Achievements, Activity, and Social Network. The guide 156 may advance through the list of friends, recent players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Figure 5:
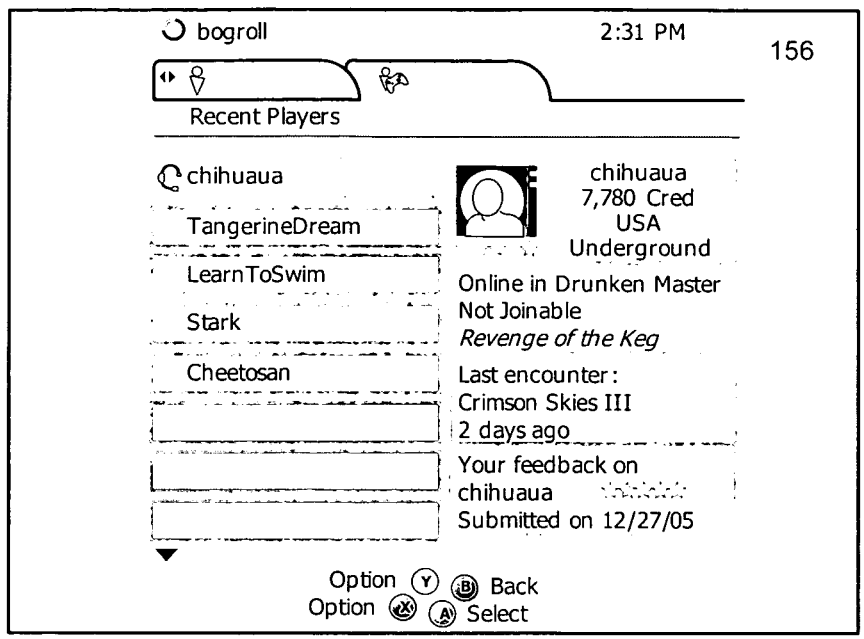
Figure 6:
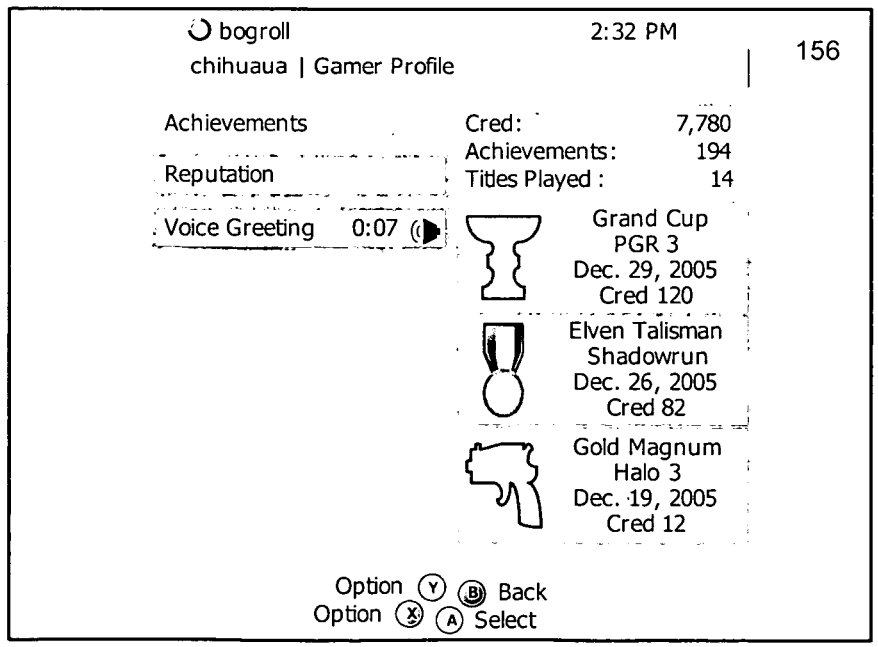
Figure 7:
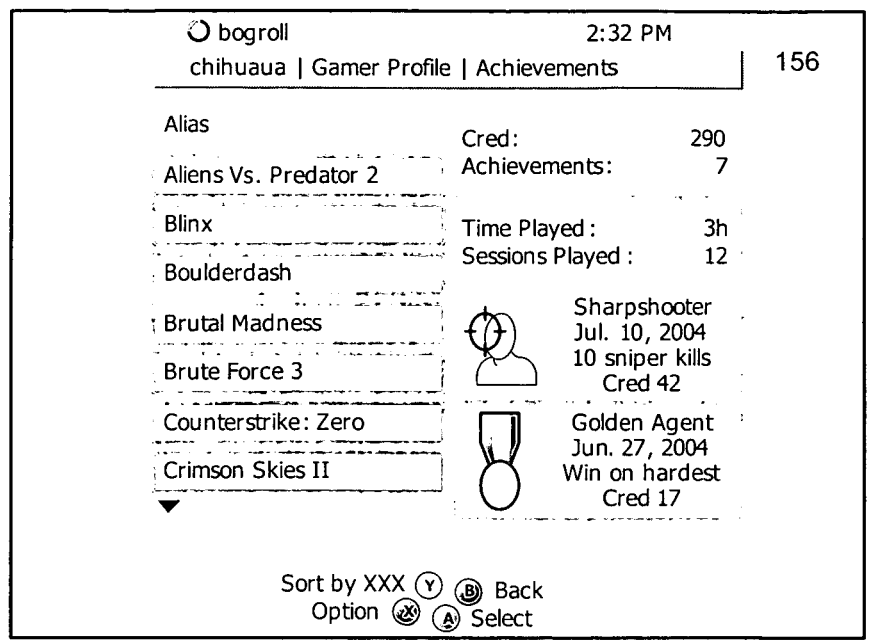
Figure 8:
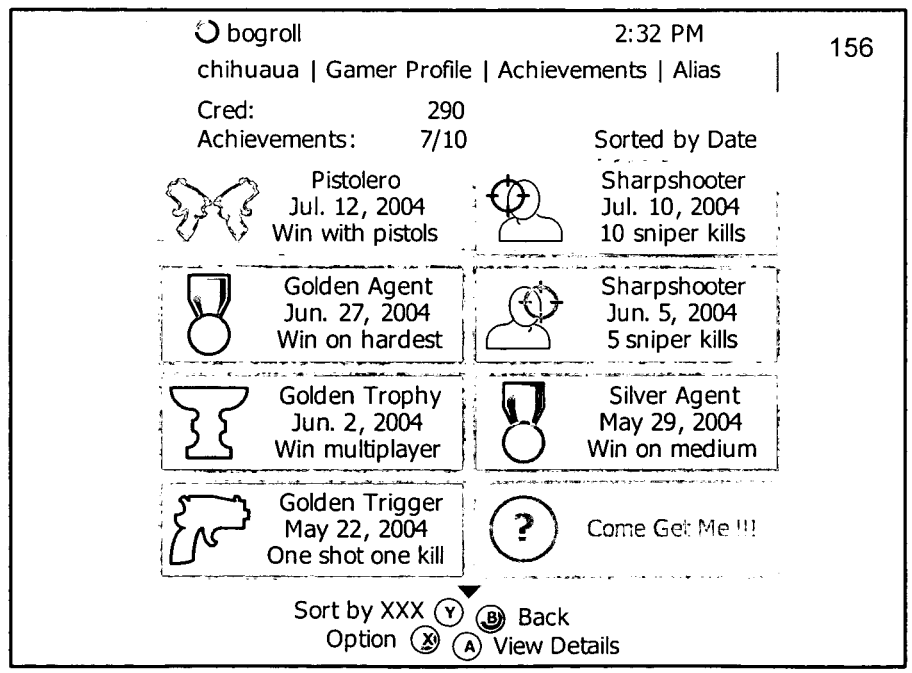

In accordance with the above, FIG. 5 illustrates a list of Recent Players in the guide 156. The Gamercard displayed in when browsing recent players may shown the base area and an extended area that provides information regarding recent games, feedback, and presence of the recent players. FIGS. 6-8 illustrate further details that may be obtained about recent players, such as general achievements and gamer Cred (FIG. 6); game specific achievements, gamer Cred, times/sessions played (FIG. 7); and a date-sorted achievement display (FIG. 8).

Figure 9:
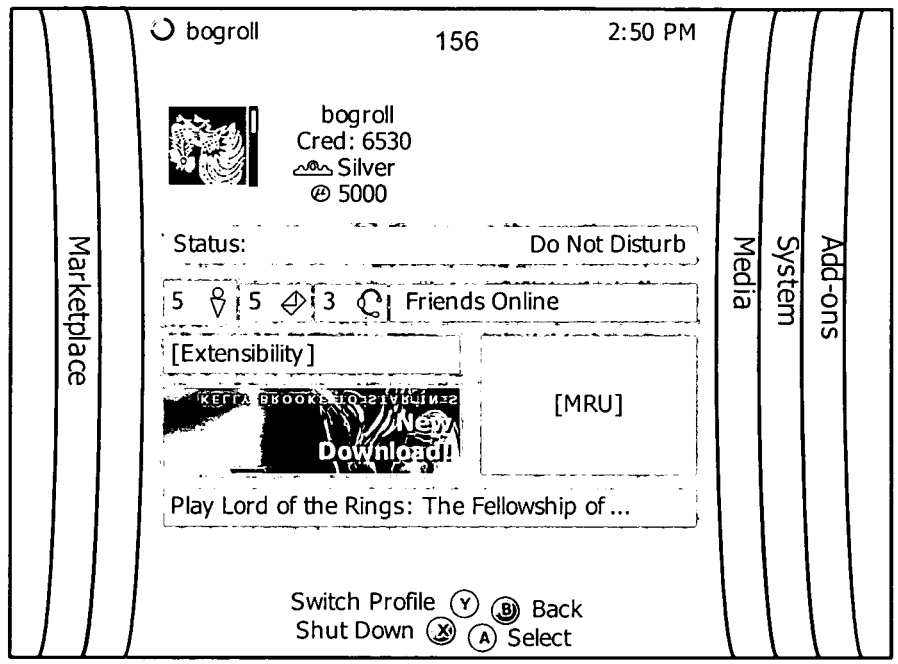
Figure 10:
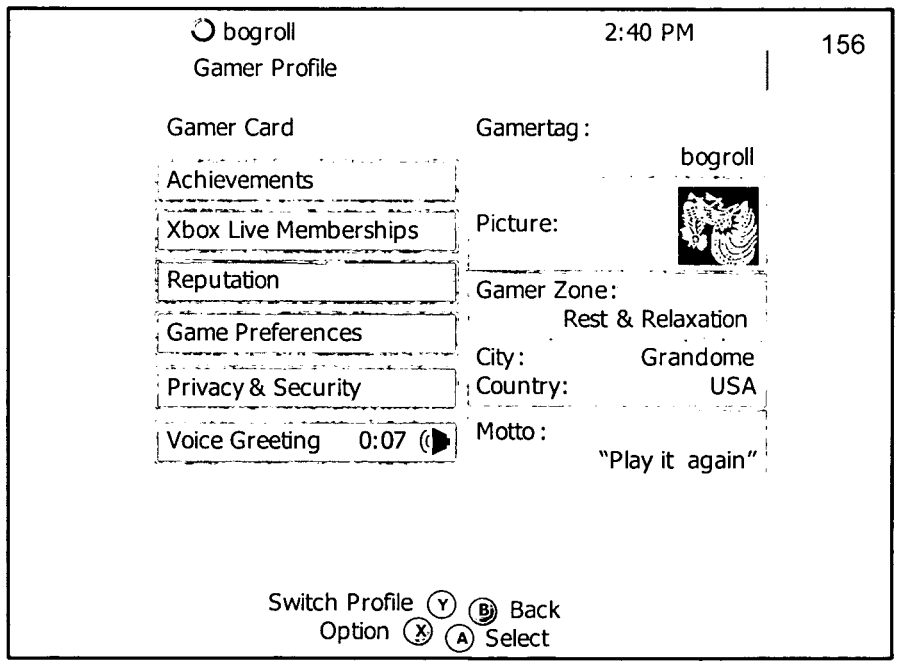
Figure 11:
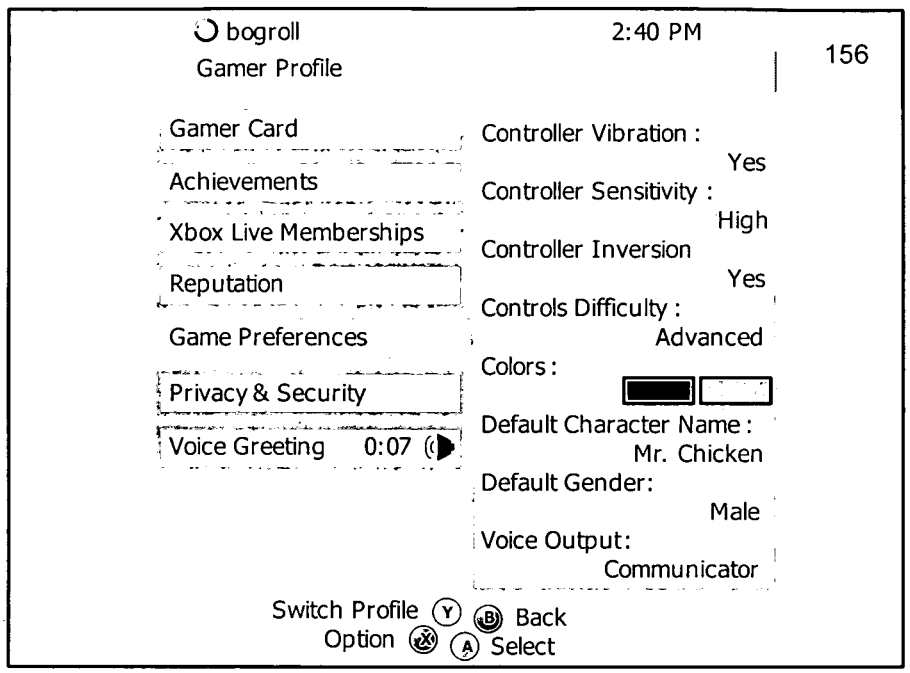
Figure 12:
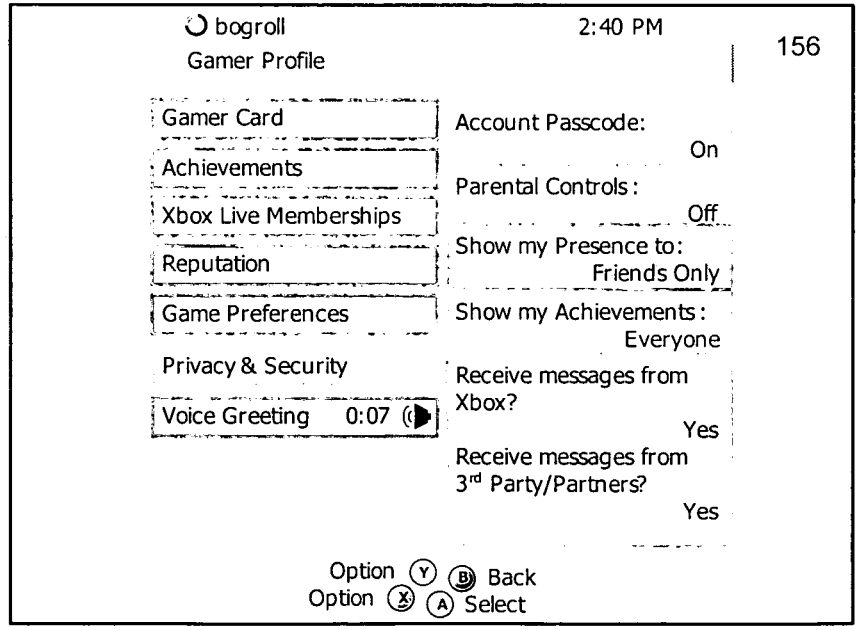
Figure 13:
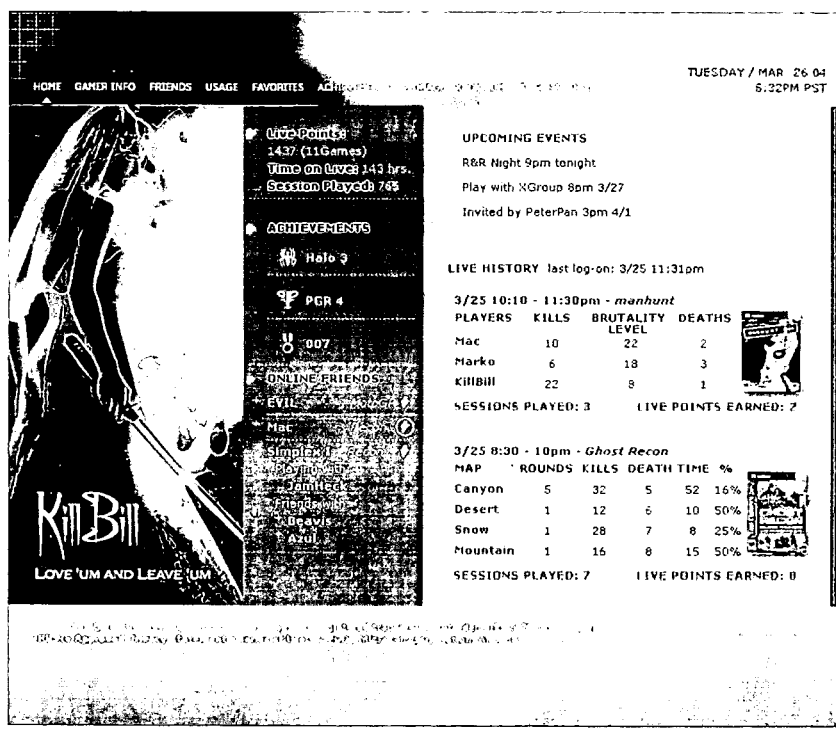

FIG. 9 illustrates an exemplary user home page from which the user may navigate among the various options provided by the service 158, edit Gamercard information, change game settings, set preferences and privacy settings, etc. Such settings and preferences may be accessed using the exemplary user interfaces of FIGS. 10-12. FIG. 13 illustrates another exemplary home page in accordance with the present invention.

In accordance with the present invention, there may be differences, however, between how the guide 156, games 154 and players trigger Gamer Profile viewing. One instance is a user-instantiated Gamercard. Here, if a user receives a request from another gamer, the user may pause the game 154 and brings up the Gamercard 172 to find out who is sending the request. There may also be a game-instantiated Gamercard 172, where a user can select to view the Gamercard 171, which brings up a Gamercard system application.

It is noted that the user interface of FIGS. 4-13 are provided for exemplary purposes only and are not intended to limit the invention as recited in the claims. Those of ordinary skill in the art will understand that there are various modifications that will fall within the scope of the appended claims.

While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A method of aggregating a user's digital gaming preferences by a gaming service including at least one internet based computer system, comprising:

receiving user input device settings for different remotely executed videogames from one or more remote computing devices associated with a user over a period of time;

maintaining the user input device settings for the different remotely executed videogames in a user profile associated with the user, the user profile including an anonymous digital identity for the user;

updating user input device settings for different remotely executed videogames based on the user input device settings received over the period of time;

receiving, from a specific new remotely executed videogame for which user input device settings have never previously been received for the user, a request for default user input device settings for the specific new remotely executed videogame;

determining default user input device settings for the specific new remotely executed videogame based on the updated user input device settings of other videogames for which user input device settings have previously been received;

sending the determined default user input device settings for the specific new remotely executed videogame to a remote computing device;

receiving said user's game achievements earned by playing the specific new remotely executed videogame;

receiving community feedback information regarding said user from other users connected to said gaming service;

updating said user profile with said user's game achievements earned by playing the specific new remotely executed videogame and with said community feedback information; and displaying said user profile, including said anonymous digital identity, to said other users in accordance with user preferences.

2. The method of claim 1, further comprising:
receiving gaming preferences from said user; and
storing said gaming preferences in said user profile.

3. The method of claim 2, further comprising applying said gaming preferences to gaming applications run on a remote computing device.

4. The method of claim 1, further comprising:
receiving self-described information provided by said user, said self-described information being editable via a user interface; and
including said self-described information in said user profile.

5. The method of claim 1, said user's game achievements including statistics and accomplishments within gaming applications run on a remote computing device, said method further comprising:
accumulating said user's game achievements while said remote computing device is connected to said gaming service and disconnected from said gaming service.

6. The method of claim 5, wherein when said user's game achievements are accumulated when said remote computing device is disconnected from said gaming service, said method further comprising synchronizing said user's game achievements with said gaming service after said remote computing device is reconnected to said gaming service.

7. The method of claim 1, further comprising:
awarding reward points in accordance with said user's game achievements; and
adding said reward points to said user profile.

8. The method of claim 1, further comprising making said user's game achievements available to said other users.

9. The method of claim 1, said displaying said anonymous digital identity further comprising providing an instance of said anonymous digital identity via a remote computing device or via the Internet for display to a gaming community.

10. The method of claim 9, further comprising:
providing at least one of a friends list and a recent players list in a guide; and
providing game achievements of users in said friends list or said recent players list.

11. In a gaming service to which gaming devices are remotely connected, a method of providing a gamer profile about a user to other users of said gaming service, said method comprising:
receiving self-provided information from said user;
receiving said user's game playing achievements;
receiving community feedback information regarding said user from said other users;
receiving user input device settings from remotely executed videogames over a time period;
updating user input device settings for different types of remotely executed videogames based on the user input device settings received over the period of time, the updated user input device settings tuned to the user's preferences;
maintaining said user's game playing achievements, the updated user input device settings, and community feedback information in the gamer profile, said gamer profile including anonymous digital identity information for said user;
making said updated user input device settings available to new game titles for which user input device settings have never previously been received for the user, the new game titles being configured to use the updated user input device settings as default settings; and
displaying said gamer profile to said other users in accordance with said user's preferences.

12. The method of claim 11, further comprising:
providing an offline mode in said gaming devices, where said game playing achievements are accumulated when said user is not connected to said gaming service; and
synchronizing said game playing achievements upon a next connection to said gaming service.

13. The method of claim 11, further comprising developing a reputation associated with said user, said reputation being based upon said community feedback information and said game playing achievements.

14. The method of claim 11, further comprising awarding reward points to said user based on said game playing achievements.

15. The method of claim 11, further comprising making said user's presence information available to said other users.

16. The method of claim 11, further comprising providing data to a guide that is executed on said gaming devices, said guide providing a graphical interface to navigate said profile.

17. The method of claim 16, wherein said guide provides at least one of a friends list and a recent players list.

18. A game server computing device, comprising:
a processor; and
a memory holding instructions executable by the processor to:
for a gamer identified by an anonymous digital identity, maintain a gamer profile by updating the gamer profile with game input device settings received from a plurality of remotely executed gaming applications;
receive, from a new remotely executed gaming application for which game input device settings have never previously been received for the gamer, a request for default gamer input device settings for the new remotely executed gaming application; and
send default gamer input device settings for the new remotely executed gaming application based on the gamer input device settings of other gaming applications for which gamer input device settings have previously been received.

\* \* \* \* \*